United States Patent [19]

Schmitz et al.

[11] 4,168,939

[45] Sep. 25, 1979

[54] ACOUSTICALLY SWEPT ROTOR

[75] Inventors: Fredric H. Schmitz, Palo Alto; Donald A. Boxwell, San Jose; C. Rande Vause, Campbell, all of Calif.

[73] Assignee: The United States of America as represented by the Administrator of the National Aeronautics and Space Administration, Washington, D.C.

[21] Appl. No.: 831,633

[22] Filed: Sep. 8, 1977

[51] Int. Cl.² .................................................. B64C 27/46
[52] U.S. Cl. ...................................... 416/228; 416/238; 415/119
[58] Field of Search ................... 416/144, 145, 134 A, 416/228 R, 228 A, 238, 226, 223, 223 A; 415/119

[56] References Cited

U.S. PATENT DOCUMENTS

| | | | |
|---|---|---|---|
| 1,801,216 | 4/1931 | Anderson | 416/238 |
| 2,043,736 | 6/1936 | Charavay | 416/238 |
| 2,451,106 | 10/1948 | Martin | 416/238 |
| 2,962,260 | 11/1960 | Foley | 415/119 X |
| 3,065,933 | 11/1962 | Williams | 416/228 A X |
| 3,399,731 | 9/1968 | Giles | 416/228 A |
| 3,989,406 | 11/1976 | Bliss | 416/223 A X |

FOREIGN PATENT DOCUMENTS

| | | | |
|---|---|---|---|
| 1903642 | 8/1970 | Fed. Rep. of Germany | 416/223 |
| 946794 | 1/1964 | United Kingdom | 416/228 |

OTHER PUBLICATIONS

Aero Digest, vol. 63, No. 1, Jul. 1951, pp. 99-107.

*Primary Examiner*—Everette A. Powell, Jr.
*Attorney, Agent, or Firm*—Darrell G. Brekke; John R. Manning; Armand McMillan

[57] ABSTRACT

Impulsive noise reduction is provided in a rotor blade by "acoustically sweeping" the chord line from root to tip so that the acoustic radiation resulting from the summation of potential singularities used to model the flow about the blade tend to cancel for all times at an observation point in the acoustic far field.

4 Claims, 33 Drawing Figures

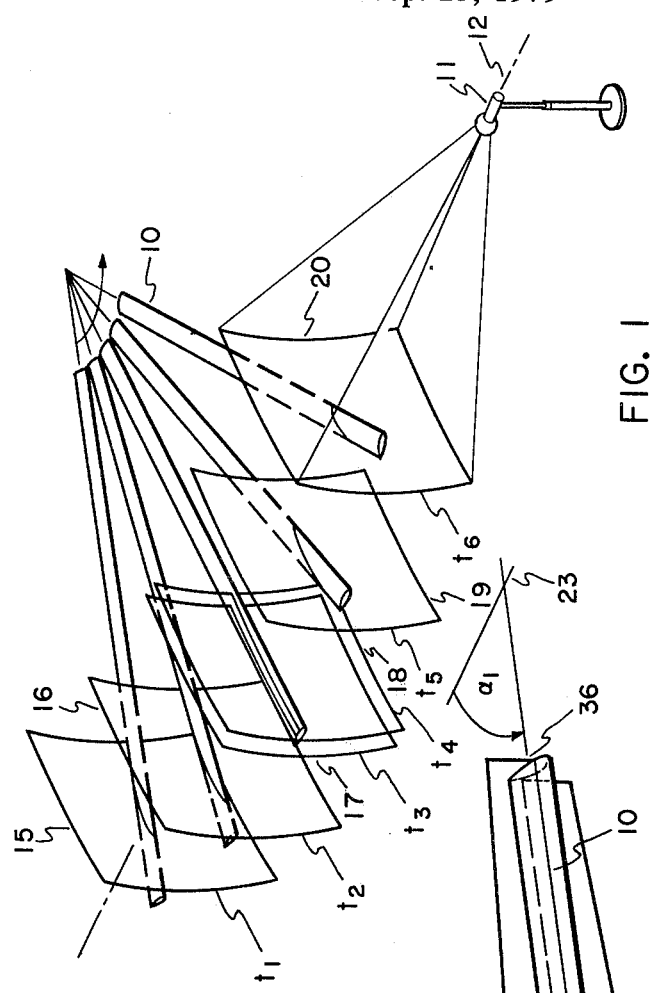
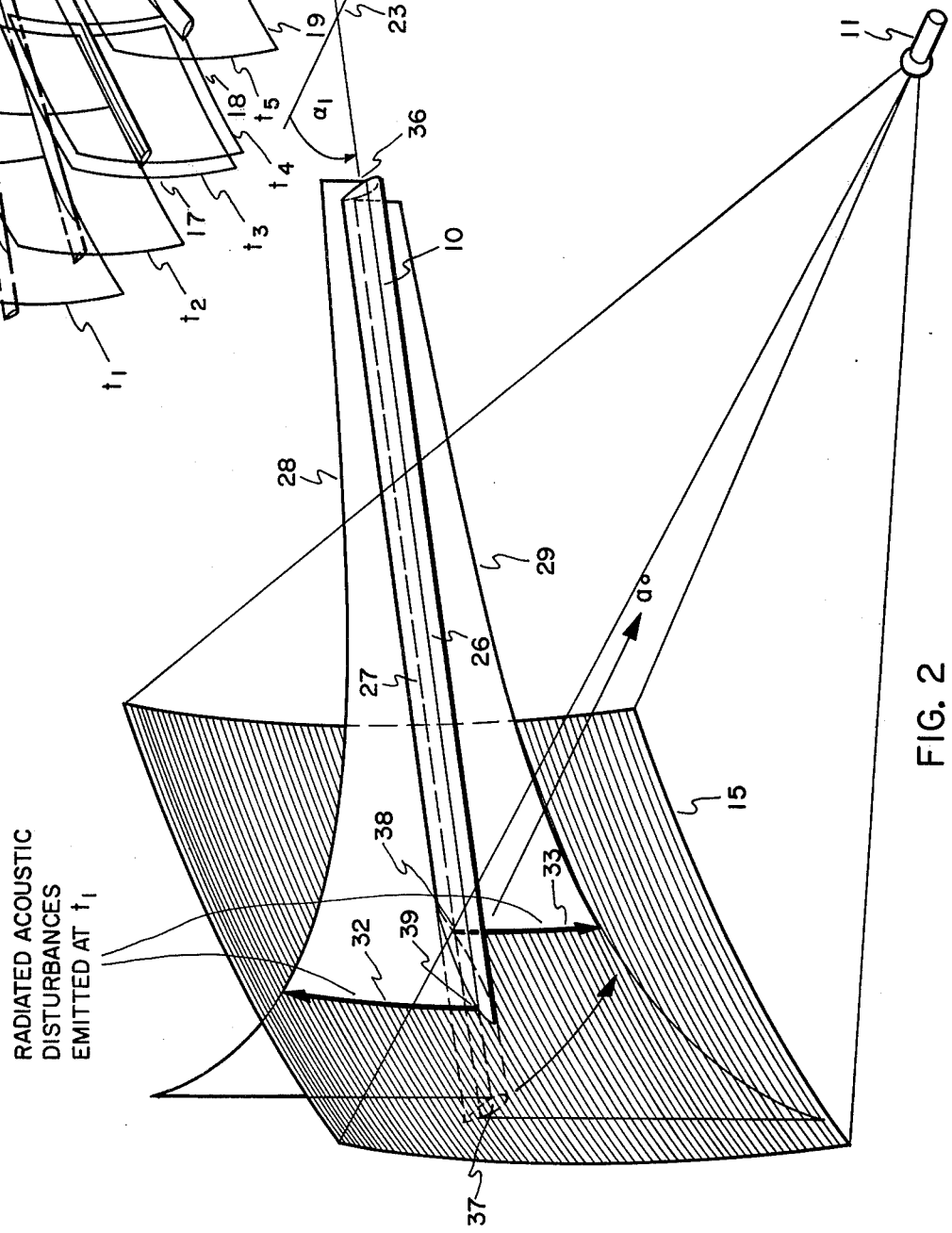
FIG. 1
FIG. 2

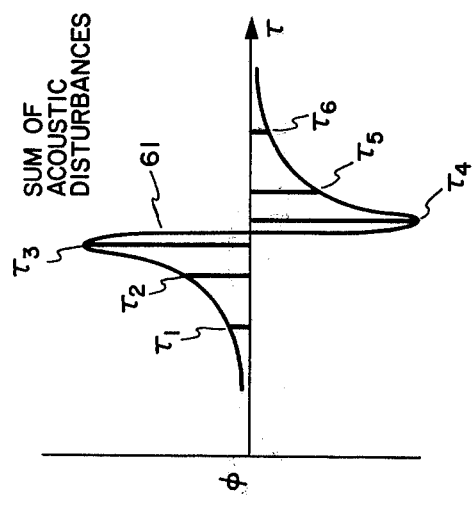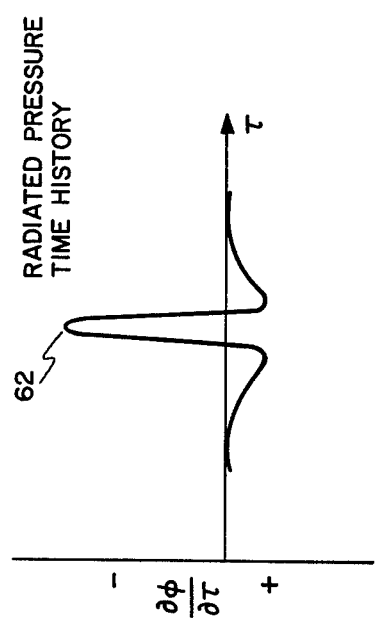
FIG. 8
FIG. 9

ACOUSTICALLY SWEPT ROTOR

The invention described herein was made by employees of the United States Government and may be manufactured and used by or for the Government for governmental purposes without the payment of any royalties thereon or therefor.

BACKGROUND OF THE INVENTION

1. Field of the Invention

The present invention relates generally to a rotor and more particularly to a rotor with reduced aerodynamically generated impulsive noise.

2. Description of the Prior Art

Sounds generated aerodynamically are sound fields which, instead of owing their existence to vibrations of solids, are rather by-products of airflows. One of the most serious problems in the development of a helicopter transportation system for civilian or military requirements is the noise generated by these vehicles due to aerodynamic mechanisms inherent in their design. A prominent and impulsive sound occurs when a helicopter operates in certain conditions. This impulsive sound is usually called blade slap or impulsive noise and it causes an observer in the acoustic far field to experience a high-level acoustic energy burst for each revolution of each helicopter blade. When impulsive noise occurs it is offensive and dominates all other helicopter noise sources. Helicopter designs, particularly in the past ten years, have increasingly called for high main and tail rotor tip speeds in order to minimize total vehicle weight and maximize payload. The combination of high hovering tip speeds and high forward velocities give rise to the impulsive noise problem. In the past, attempts have been made to reduce impulsive noise by altering the rotor tip shape or lowering the rotor tip speed. Although some impulsive noise reduction can be achieved by thinning the rotor tip, structural and aerodynamic constraints prevent the tips from being thinned enough to significantly reduce impulsive noise.

Previous rotor modifications aimed at alleviating blade slap have concentrated only on the very tip of the blade. We have found that at least the outer 30% of the rotor significantly contributes to rotor impulsive noise. For example, the rotor disclosed in U.S. Pat. No. 3,721,507 (Robert A. Monteleone) has a tip that is linearly and rearwardly swept in order to alleviate blade instability at high speed flight. Although Monteleone claims that noise reduction also results from the swept tip, our research indicates that the linearly swept tip actually generates two, rather than one, acoustic energy pulses per blade revolution.

Lowering tip speed has been the only truly effective method of lowering impulsive noise levels. This method has been used throughout the helicopter industry to attempt to meet the low noise levels required for military and commercial applications. The tradeoffs for rotor tip speed reduction are reduced rotor performance and decreased helicopter productivity—tradeoffs that helicopter users wish to avoid.

SUMMARY OF INVENTION

The disadvantages and limitations of prior art rotor blades are obviated by the present invention which provides a novel blade having a chord line that is nonlinearly varied from root to tip in a particular manner. Specifically, the blade is acoustically swept so as to provide impulsive noise cancellation.

Potential singularities (monopoles, dipoles and quadrupoles) may be employed to mathematically model the flow around a blade. As air flows around a modeled blade, the potential singularities serve as sources of acoustic disturbances. A conventional nonswept rotor blade generates an intense, unpleasant to the ear, negative pressure acoustic disturbance every blade revolution. If a microphone is monitoring the impulsive noise from the rotating blade, it turns out that the large negative pressure acoustic disturbance results when the sound locus of the microphone coincides with the potential singularity lines of the blade. An advantage of the present invention is that it provides a blade whose platform is so contoured such that the acoustic radiation resulting from the summation of potential singularities used to mathematically model the flow about the blade tend to cancel for all times at an observation point in the acoustic far field.

BRIEF DESCRIPTION OF THE DRAWINGS

FIG. 1 is a perspective view of an acoustic test setup of a conventional nonswept rotor blade.

FIGS. 2–7 are enlarged views of segments of FIG. 1. Each view depicts the blade at a different time t.

FIG. 8 shows the sum of acoustic disturbances generated by the blade in FIGS. 1–7.

FIG. 9 illustrates the radiated pressure time history of the blade of FIGS. 1–7.

DETAILED DESCRIPTION OF THE INVENTION

Figure 3:
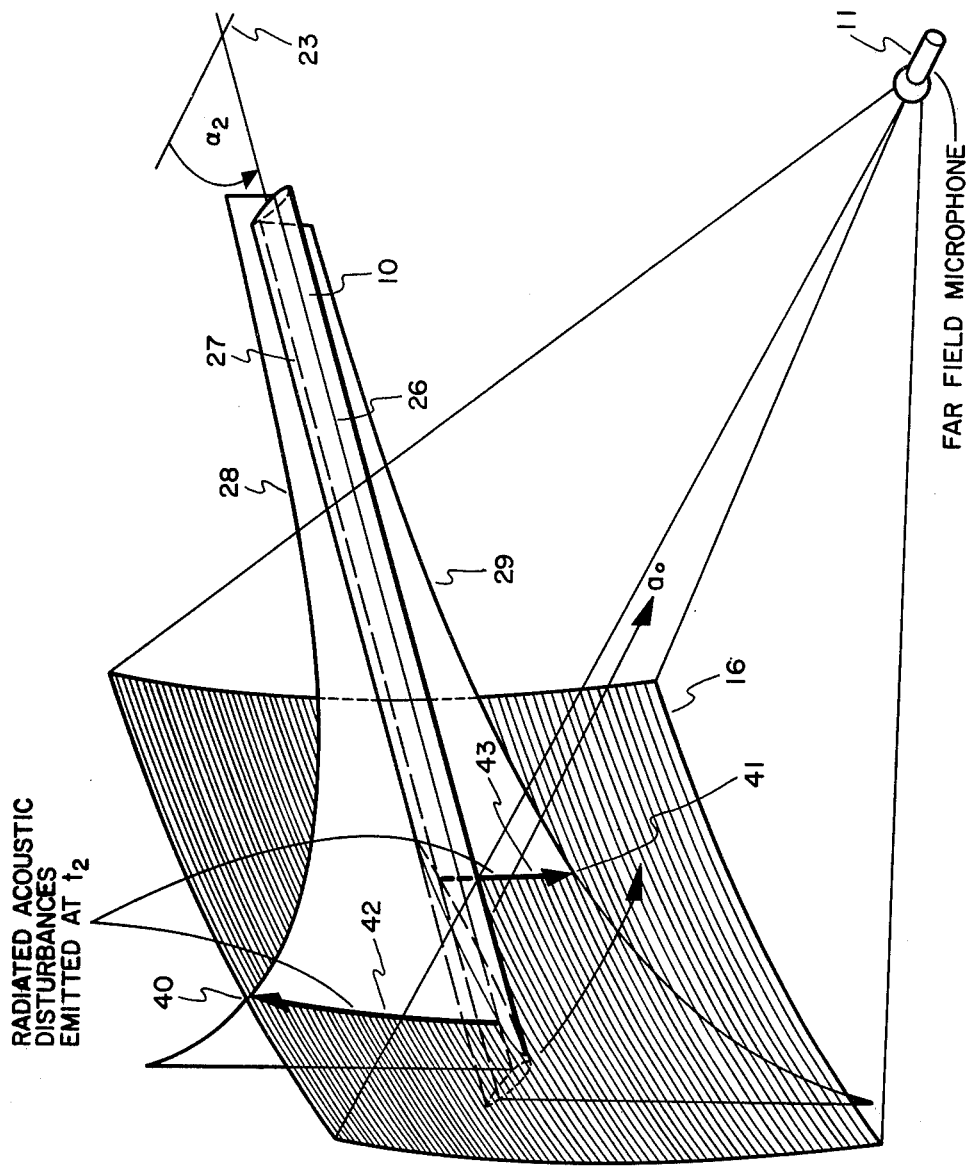

In order to understand the subject invention it helps to understand how a standard helicopter rotor generates impulsive noise. Referring now to FIG. 1 of the drawings, there is illustrated a test setup for measuring impulsive noise radiated from a conventional unswept blade 10 of a helicopter (not shown) at different times t. A microphone 11 is stationed in front of the helicopter in the acoustic far field. The axis of sensitivity 12 of the microphone 11 is in the plane of rotation of blade 10 and is parallel to the longitudinal axis of the helicopter fuselage. As blade 10 is rotated counterclockwise at a high tip speed, air flows over the blade and radiates acoustic disturbances which eventually reach microphone 11.

Amplification and readout apparatus (not illustrated) connected to microphone 11 enables the blade noise to be accurately measured. Acoustic disturbances generated by blade 10 at time t reach microphone 11 at retarded time $\tau$ where $\tau = t + r/a_o$, and r = the distance from the disturbance point to the microphone at time t, $a_o$ = the local speed of sound.

For some time t, there exists an "acoustic characteristic" or "acoustic wavefront" which is the locus of all points propagating at the speed of sound, $a_o$, that eventually arrives at microphone 11 at time $\tau$. Any particular sound locus that approaches the observation point will "acquire" acoustic disturbances from a blade intersecting with the locus at various azimuth and radial positions. The locus that reaches the observation point at time $\tau$ is then a collection of all the acoustic disturbances that have coincided with it subsequent to its inception. The sound locus has a spherical surface. As the sound locus approaches the observation point at the speed of sound, it has the appearance of a constantly diminishing sphere. Sound loci 15-20 are associated with times $t_1$-$t_6$, respectively. For simplicity of depiction, loci 15-20 are shown as fragments of hemispheres.

FIG. 2 is an enlarged view of a segment of FIG. 1. Specifically, FIG. 2 depicts how blade 10 intersects sound locus 15 at time $t_1$. At time $t_1$ blade 10 forms an acute angle $\alpha 1$ with reference axis 23 which is parallel to the longitudinal axis of the helicopter fuselage.

The acoustic field generated by a rotating blade is comprised of acoustic sources or singularities known as monopoles, dipoles, and quadrupoles. See, for example, 1962 *Philosophical Transactions of the Royal Society of London*, Serial A, 147-182, "Sound Generated Aerodynamically," M. J. Lighthill. A dipole consists of a positive monopole and a negative monopole. At any one moment the sum of their strengths is zero. The combination of two equal and opposite dipoles is known as a quadrupole. The strength of a monopole is proportional to the rate of change of local fluid mass outflow or inflow, whereas dipole strength is equal to the local rate of change of fluid momentum (applied force). Quadrupole strength is representative of the externally applied stress. An element of fluid under stress suffers from equal and opposite forces on both sides, each force being equivalent to a dipole and each pair of dipoles being equivalent to a quadrupole. Monopoles, dipoles and quadrupoles can be represented in a positive sense, generating a positive acoustic pressure change, and a negative sense, generating a negative pressure fluctuation. As used herein, "source" means monopoles, dipoles and quadrupoles with a positive sense $(+\phi)$, and "sink" means negative sense acoustic singularities $(-\phi)$.

Blade 10 has a uniform airfoil cross section from root 36 tip 37. For ease of illustration and explanation, blade 10 has been modeled with only one source 26 and one sink 27. When the flow about an airfoil is modeled, the sources and sinks are usually situated on the airfoil center line. Here, to make the sound locus/acoustic singularity intersection more discernible, the location of the source is represented by line 26 on the upper surface of the airfoil, and the position of the sink is represented by parallel line 27 on the under side of blade 10. Nonlinear curve 28 depicts the source strength as a function of blade length, and similar, but inverted, curve 29 illustrates the sink intensity as a function of blade length. Both curves have been amplified by the Doppler effect.

The acoustic disturbances at tip 37 are much greater than the disturbances at root 36. At time $t_1$, the aerodynamically generated acoustic energy resulting from the airflow around blade 10 is determined by observing the strength of the source at point 39 where the sound locus 15 intersects the source 26 and by observing the strength of the sink at point 38 where the sound locus 15 intersects the sink 27. Specifically, at time $t_1$ a positive acoustic disturbance 32 is radiated simultaneously with a negative acoustic disturbance 33. The intensity of disturbances 32 and 33 varies as an inverse of the square of the distance traveled. Inasmuch as disturbance 32 is larger than disturbance 33, when the acoustic energy from the disturbances finally reaches microphone 11 at retarded time $\tau_1$, the diaphragm of microphone 11 only "sees" a positive potential, and a potential which is a fraction of the difference between the source and sink potentials at sound locus 15.

FIG. 3 illustrates the intersection of blade 10 and sound locus 16 at time $t_2$. Blade 10 makes an acute angle $\alpha_2$ with reference axis 23. Sound locus 16 effectively crosses acoustic disturbance curves 28 and 29 at points 40 and 41, respectively. New acoustic disturbances 42 and 43 are generated at time $t_2$ and they ultimately produce a positive potential at far field microphone 11 at time $\tau_2$.

Figure 4:
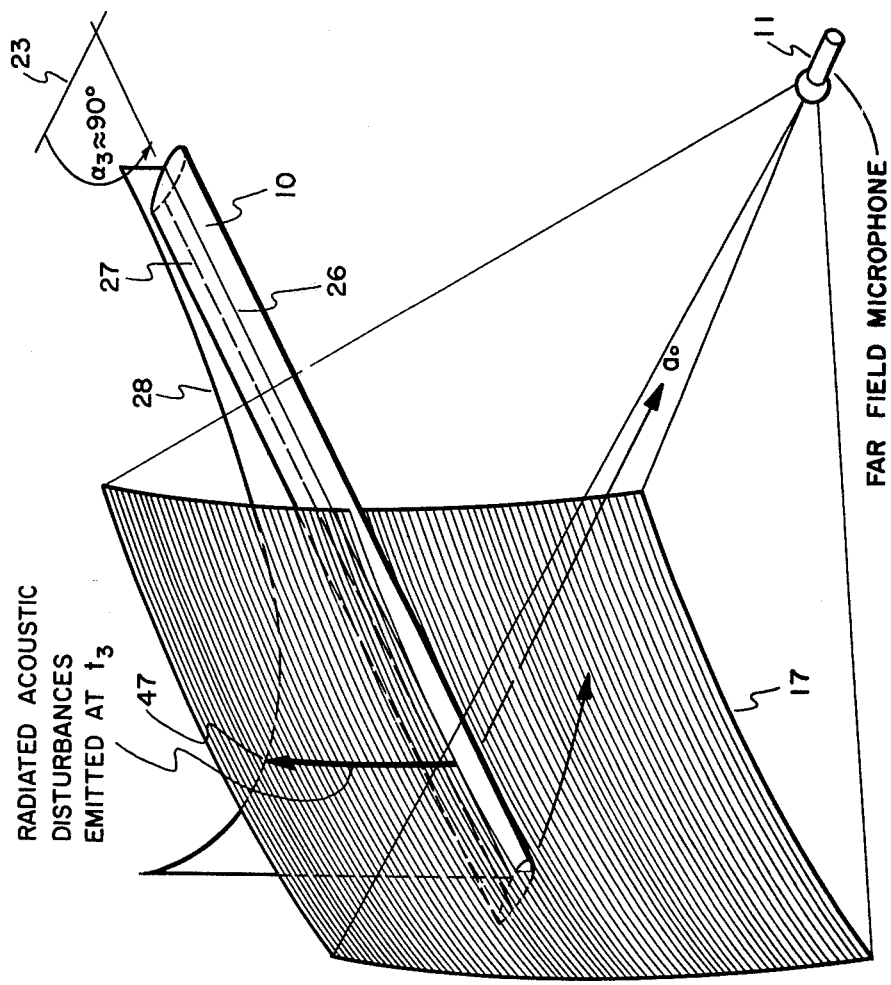

Referring now to FIG. 4, at time $t_3$ blade 10 is approximately normal to axis 23 and sound locus 17 only intersects the source, not the sink. Accordingly, at time $t_3$ sound locus 17 only crosses curve 28, at point 47, and the generated acoustic energy is observed at time $\tau_3$ at microphone 11 as a positive pressure field.

Figure 5:
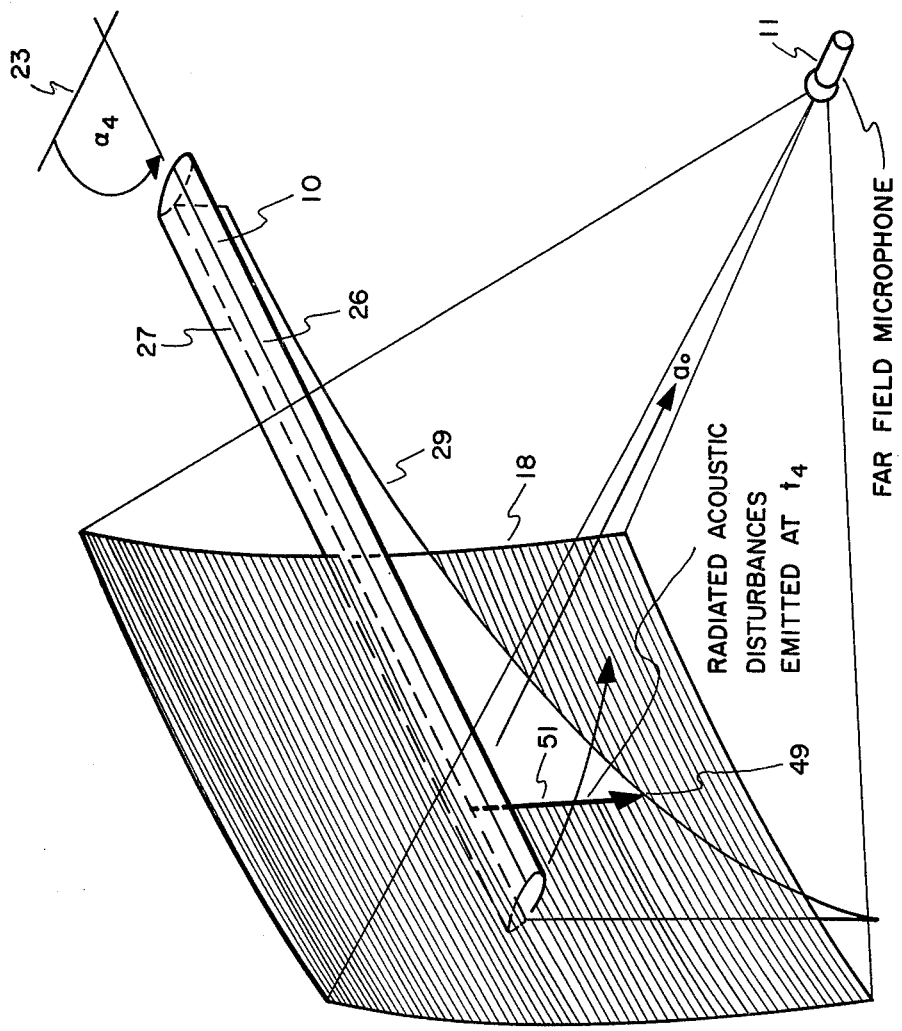

The time increment between $t_3$ and $t_4$ is very small and FIG. 5 depicts blade 10 at time $t_4$. At $t_4$ blade 10 forms an angle with axis 23 that is slightly larger than 90 degrees. Sound locus 18 completely misses the source and intersects the sink at a blade position corresponding to point 49 on curve 29. Thus, at time $t_4$, negative potential 51 is radiated and no positive potential is emitted at all.

Figure 6:
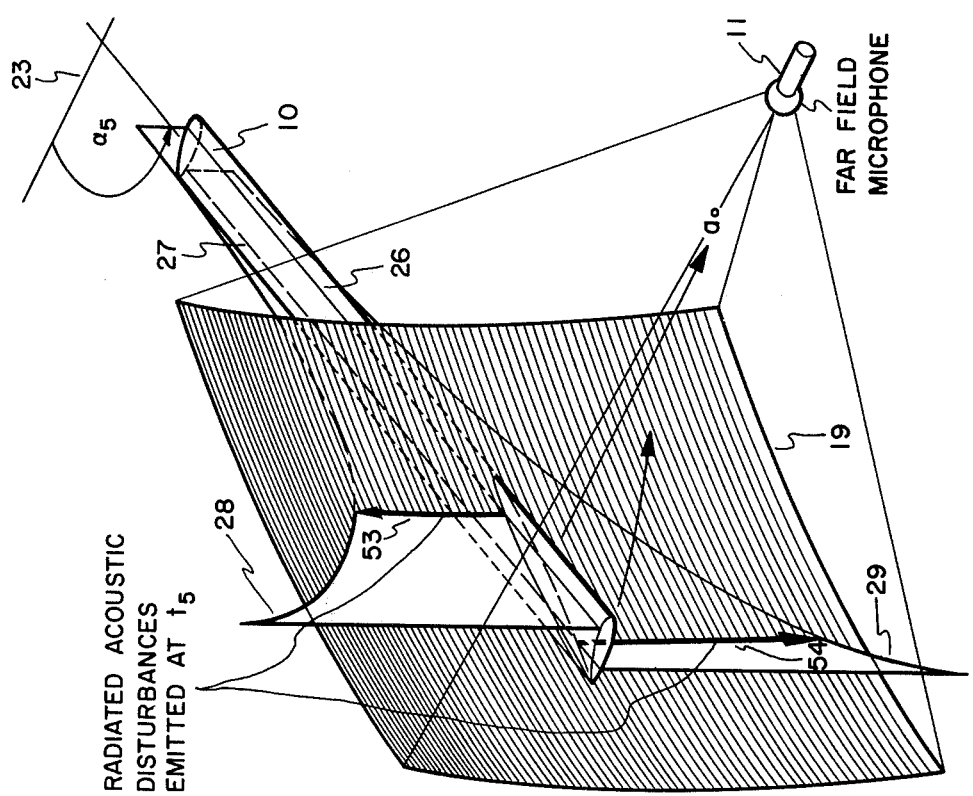

In FIG. 6, at time $t_5$, blade 10 makes obtuse angle $\alpha_5$ with axis 23, and sound locus 19 intersects both the source and the sink generating acoustic disturbances 53 and 54, respectively. Thus, at retarded time $\tau_5$, the source potential is cancelled by the sink potential and a net negative potential reaches microphone 11.

Figure 7:
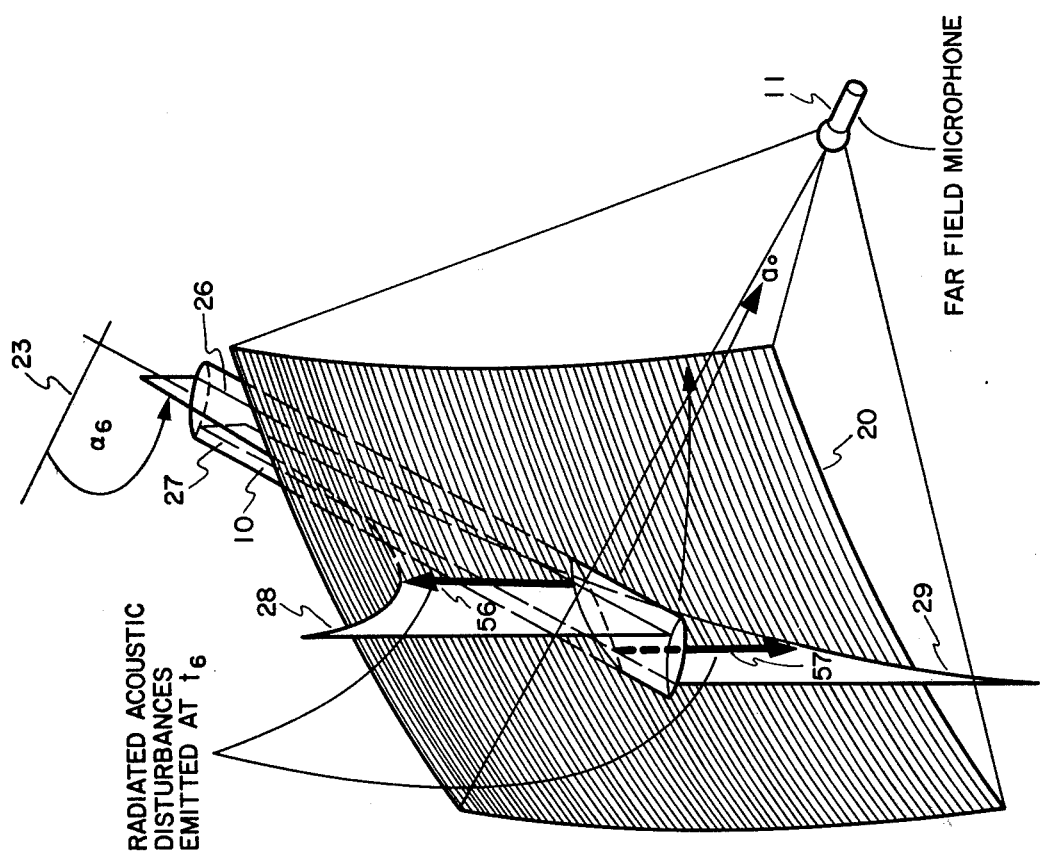

Referring now to FIG. 7, the source and sink of blade 10 intersect sound locus 20 at time $t_6$ and generate acoustic disturbances 56 and 57. The amplitude of disturbance 57 is slightly greater than disturbance 56 so that microphone 11 experiences a negative potential at $\tau_6$ which is smaller than the potential received at $\tau_5$.

The differential between disturbances 32 and 33 (FIG. 2) is not the only noise that reaches microphone 11 at time $\tau_1$. In cases where the advancing tip Mach number is less than 1.0, sound locus 15 passes blade 10 at some time $t_1 + \epsilon$ (a time later than $t_1$). Before it passes blade 10, locus 15 intersects blade 10 at numerous other locations to the right of the intersection depicted in FIG. 2. A new acoustic disturbance is generated at each intersection and these disturbances (traveling at the speed of sound, $a_o$) reach the microphone 11 simultaneously at retarded time $\tau_1$. The additional acoustic disturbances have the same polarity differential as the differential between disturbance 32 and disturbance 33 (a positive polarity). Likewise, other acoustic disturbances are generated as each locus passes the blade. The noise generated when locus 16 passes the blade reaches microphone 11 at time $\tau_2$, etc. Of course when loci 19 and 20 pass the blade, negative polarity acoustic disturbances are emitted and conveyed to the observation point.

The far field potentials observed at microphone 11 for retarded times $\tau_1-\tau_6$ are depicted in FIG. 8. The curve 61 connecting the potential amplitudes represents the limiting case of a rotor at an infinite number of aximuthal positions. The derivative of this potential function with respect to time ($\partial o/\partial \tau$) represents the radiated acoustic signature of the rotor noise and it is illustrated in FIG. 9. Negative pressure is shown above the axis of the abscissa in accordance with the convention followed in the helicopter field of technology. As indicated by this figure, a large negative pressure pulse 62 is generated when the sound locus is coincident with the potential singularity lines used to model the blade. That is, a large burst of impulsive noise (negative pressure) is generated when the sound locus lines up with source and sink lines 28 and 29 (when $\alpha$ is approximately 90°).

Figure 10:
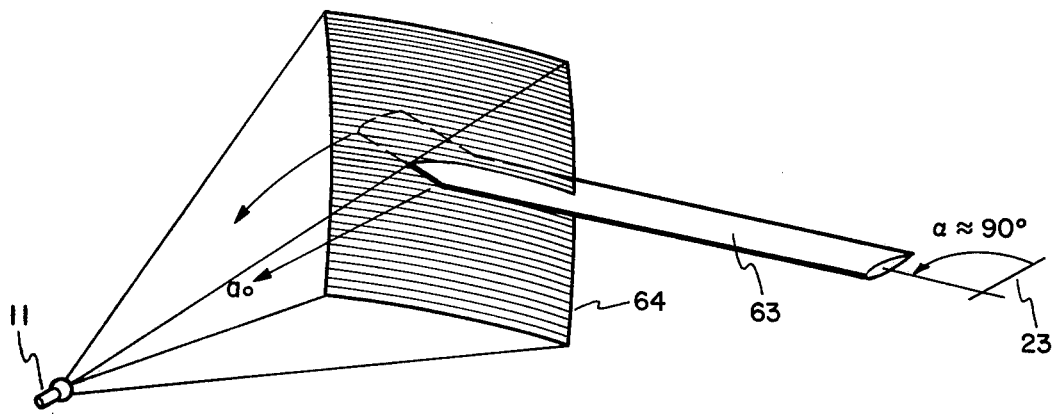
FIGS. 10 and 11 are perspective views of a prior art blade having a linearly swept tip.
Figure 11:
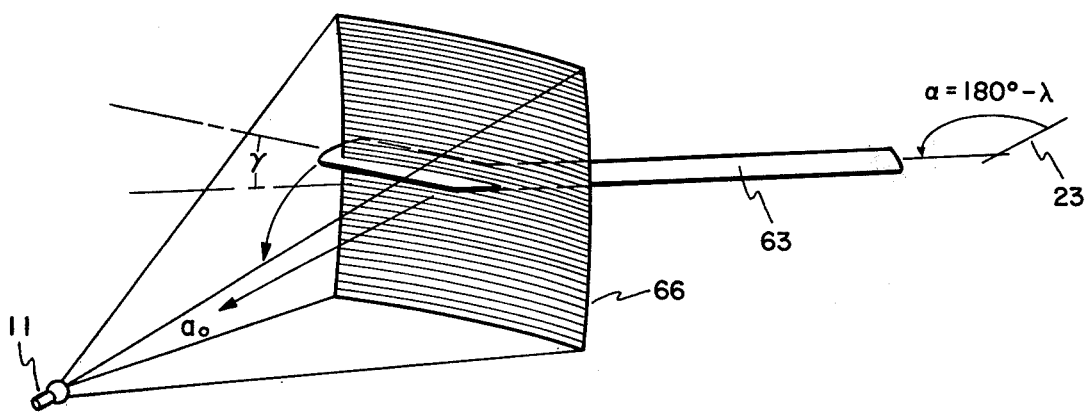

FIGS. 10 and 11 depict a prior art helicopter blade 63 at aximuth positions of 90° and (180° $-\lambda$). The tip of the blade is characterized by a linear rearward sweep, at angle $\lambda$, for the purpose of reducing high speed instability. Unlike blade 10, blade 63 actually generates two significant negative pressure acoustic disturbances per revolution. When $\alpha$ is approximately 90° (FIG. 10), sound locus 64 first coincides with the source line of the unswept portion of blade 63 and then a very short time later the sound locus coincides with the sink line of the unswept portion of the blade. This results in two opposite polarity potentials comparable to $\tau_3$ and $\tau_4$ in FIG. 8. The potentials produce a negative pressure disturbance similar to pulse 62 in FIG. 9. Another negative pressure disturbance is created when the blade angle $\alpha$ is (180° $-\lambda$). At that aximuth position (FIG. 11) the sound locus 66 is coincident with the source line of the tip and then coincident with the sink line of the tip. Large opposite polarity potentials are generated and microphone 11 eventually experiences a second negative pressure spike similar to pulse 62.

Figure 12:
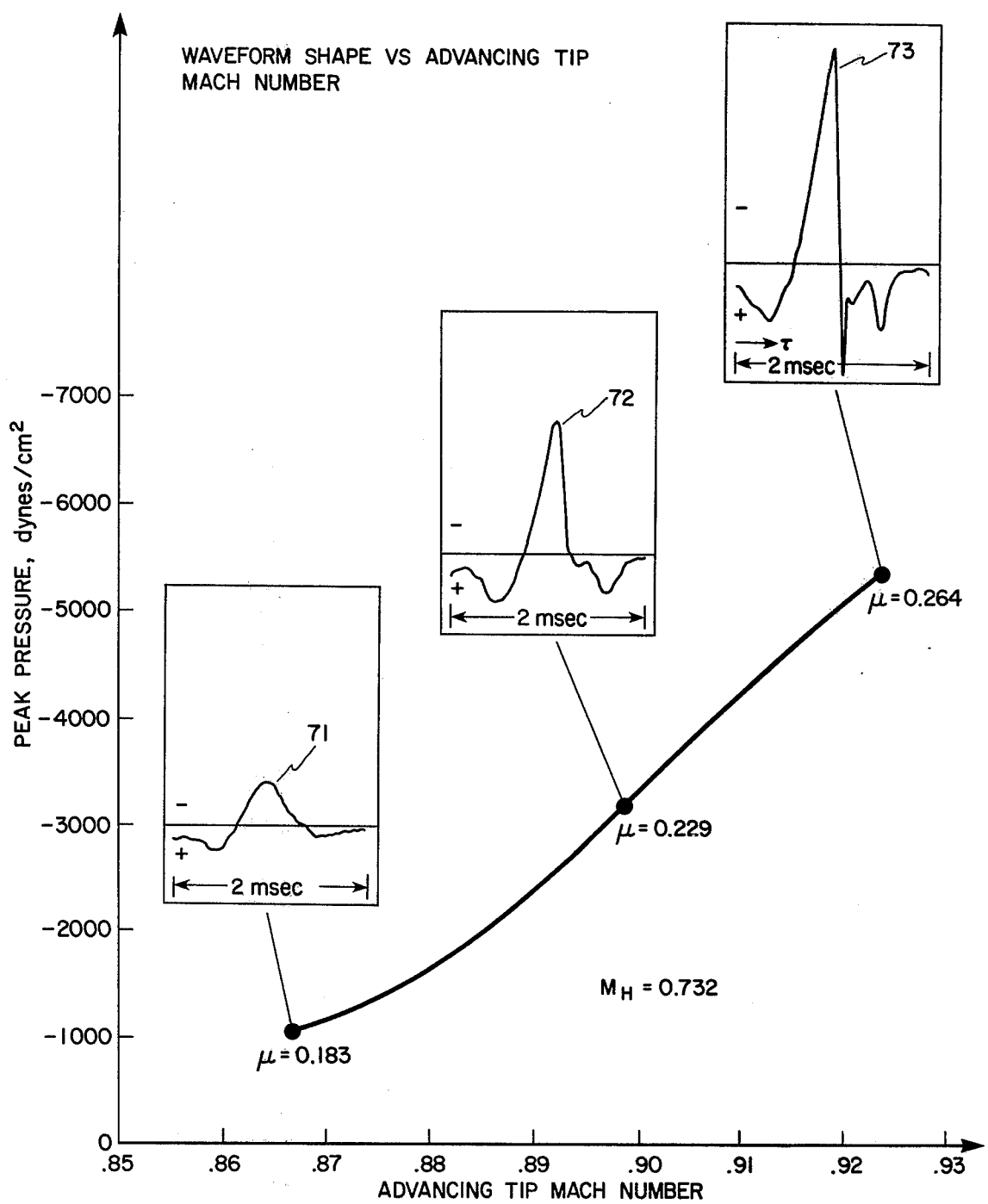
FIG. 12 depicts acoustic test data associated with a Model UH-1H helicopter.

The waveform of high-speed impulsive rotor noise changes character as the advancing tip Mach number ($M_t$) is increased. FIG. 12 shows the correlation between peak pressure and advancing tip Mach number for a one-seventh scale model UH-1H, Iroquois, helicopter, better known as the "Huey". The figure also depicts the impulsive noise waveforms associated with three different tip speeds. The UH-1H rotor has two unswept blades. At $M_t=0.867$, a large triangular negative pressure pulse 71 is observed. At $M_t$ 0.90, the negative pulse 72 is more than twice as large as pulse 71 and the return to near atmospheric pressure from the large negative value is "step-like" in character. This rapid increase in pressure coincides with the formation of a weak, radiating shock wave. At $M_t=0.925$ the negative pressure pulse 73 reaches a magnitude approximately 165% of pulse 72, and the waveform exhibits an almost discontinuous increase in pressure from the large negative value. This rapid increase in acoustic pressure correlates with the periodic radiation of a shock wave from the advancing side of the rotor. A continuous shock wave develops off the tip of the airfoil as the blade moves between the 85° and 110° stations (180° corresponds to the forward direction of the helicopter). As the rotor angle increases from 110°, the shock moves forward ahead of the leading edge of the airfoil and propogates in the direction of forward flight.

Figure 13:
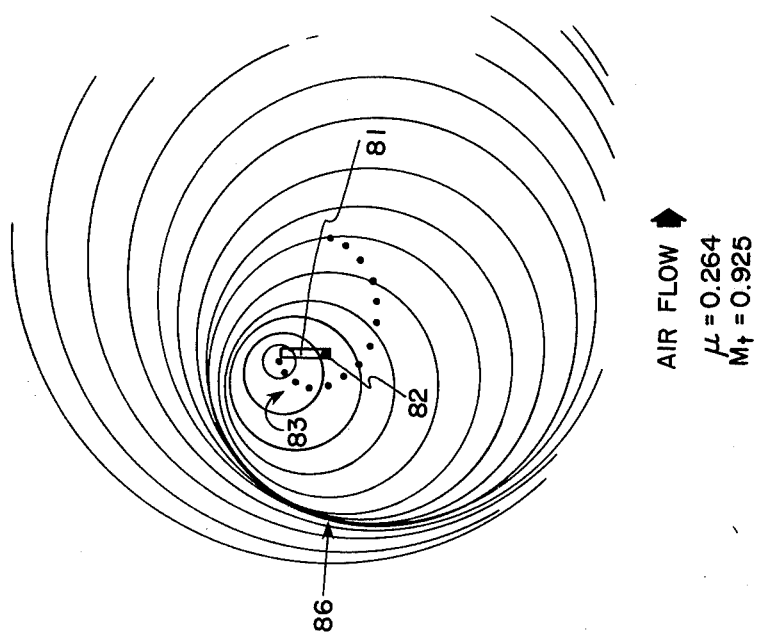
FIG. 13 is a plan view of the acoustic wavefronts generated by an unswept blade at $M_t=0.925$.

When a stone is dropped in a calm pond, circular wave fronts can be seen radiating outwardly from the point of impact. FIG. 13 is a schematic representation of sound waves radiating from the tip of an unswept blade with an advance ratio ($\mu$) of 0.264 and an advancing tip Mach number ($M_t$) of 0.925. Linear blade 81 pivots clockwise around pivot 82. Points 83 show the path taken by the blade tip for equal time intervals. Each circular wave front, propogating at the speed of sound in the moving air, coincides with a particular point 83. Because the blade tip speed approaches the speed of sound, the wave fronts are compressed together at region 86 and a shock wave is propogated ahead of the airfoil in the forward direction of flight. The compacting process occurs every cycle of the blade and reaches a maximum when the blade is normal to the direction of flight.

Figure 14:
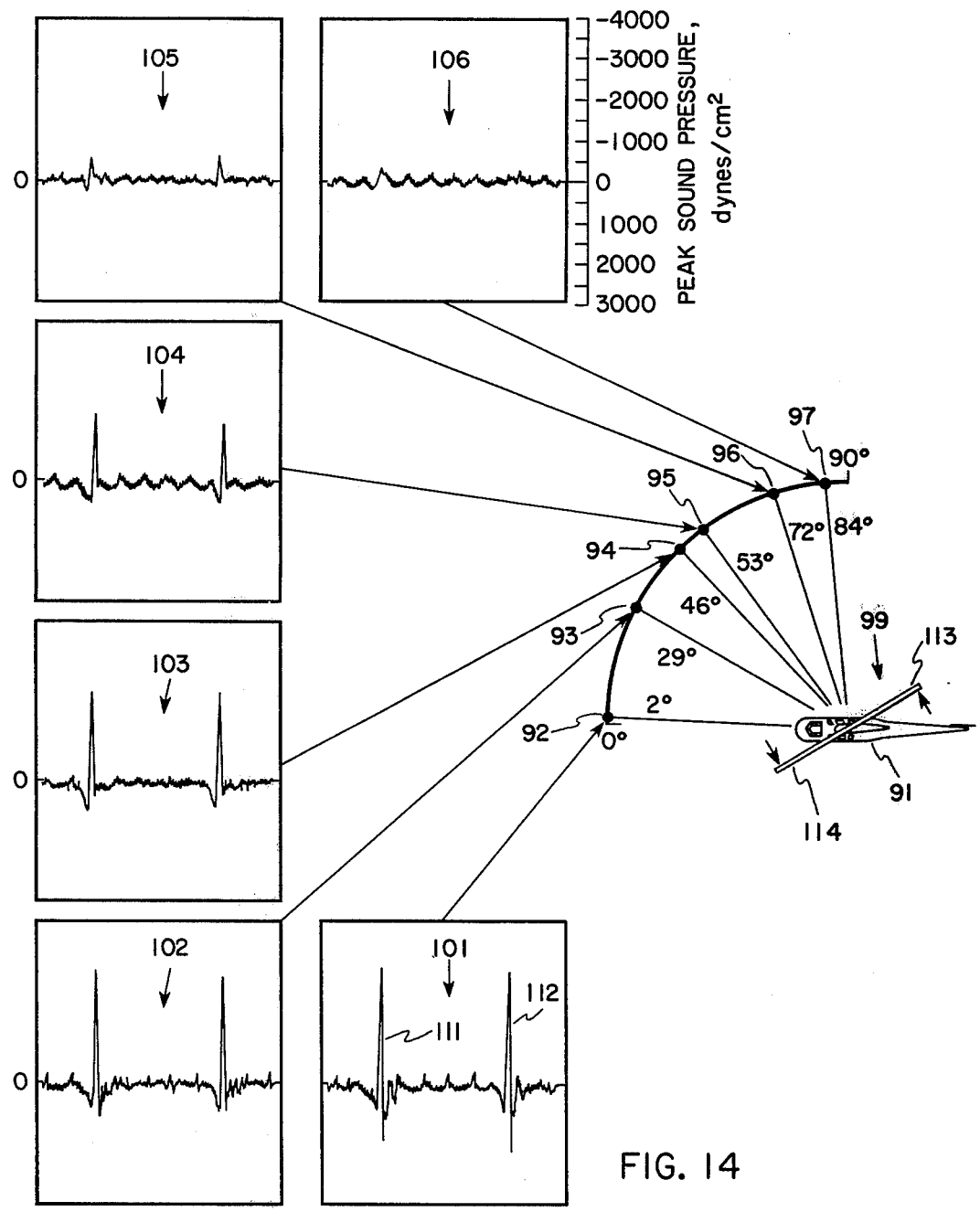
FIG. 14 shows how impulsive noise varies as the observation point is changed.

FIG. 14 shows how impulsive noise from an unswept rotor varies as a function of radiated direction. During the forward flight of a UH-1H helicopter 91 at 115 knots IAS, a microphone affixed to the tail assembly of a monitoring aircraft, an OV-IC (not shown), was positioned 95 feet away from the helicopter at observer stations 92–97, all in the plane of the rotor 99. Waveforms 101–106 were observed at stations 92–97, respectively. Each waveform represents one revolution of rotor 99. For example, in waveform 101, negative pressure pulse 111 is generated by blade 113 and pulse 112 is emitted by blade 114 (180° later). The negative pressure peak is maximum at station 92 and falls off uniformly with increasing lateral directivity until it is barely discernible at station 97. Additional test data associated with an unswept helicopter rotor may be found in "High-Speed Helicopter Impulsive Noise," C. R. Vause, F. H. Schmitz, and D. A. Boxwell, 32nd Annual National Forum of the Helicopter Society, May 1976, and "In-Flight Far-Field Measurement of Helicopter Impulsive Noise," F. H. Schmitz and D. A. Boxwell, *Journal of the American Helicopter Society*, October 1976.

Figure 15:
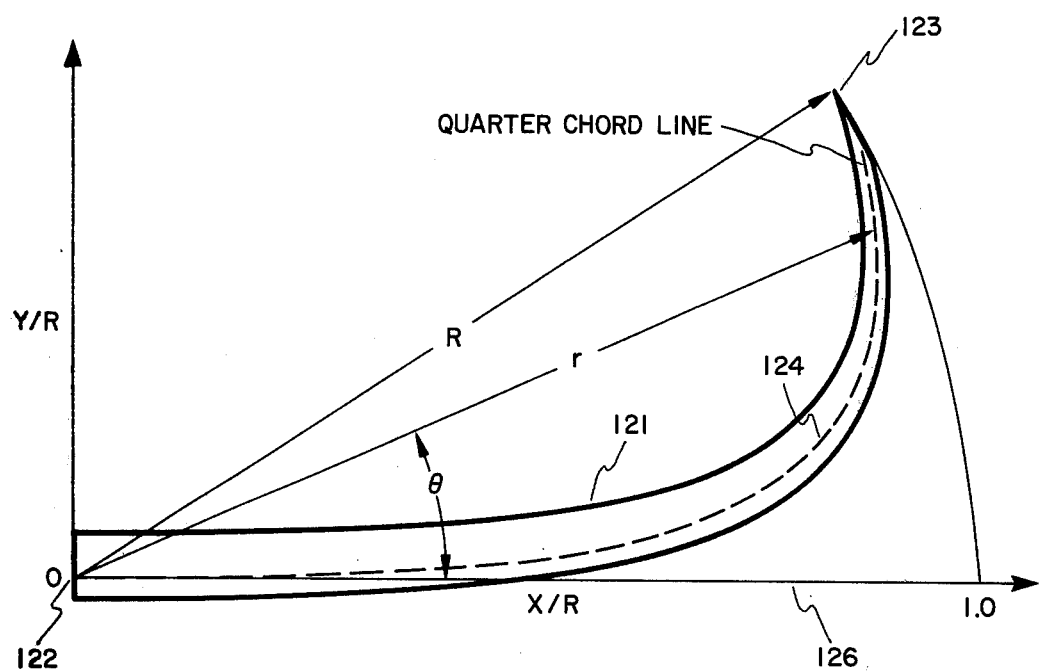
FIG. 15 depicts the rotor blade of the present invention and reveals some of the geometry parameters employed in the curve equation.
Figure 16:
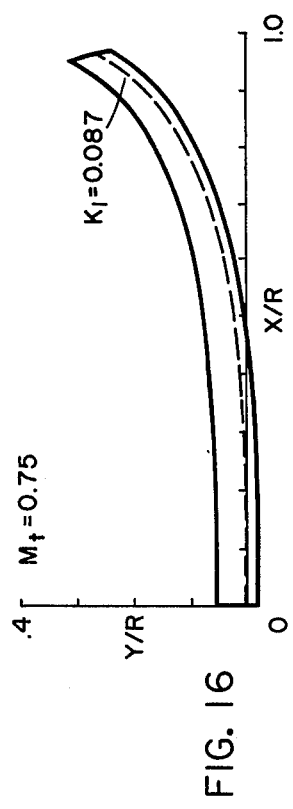
FIGS. 16–27 show how the blade of the present invention is altered as $M_t$ and $K_1$ are varied.
Figure 17:
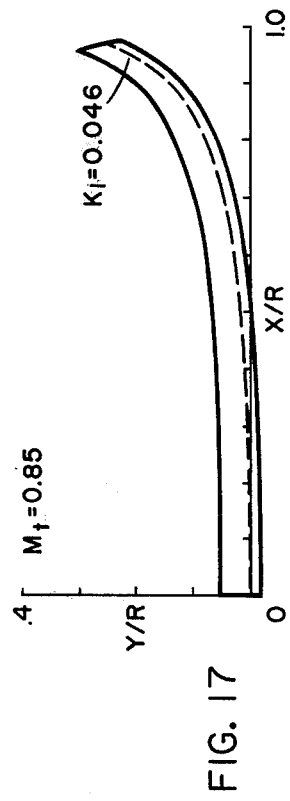
Figure 18:
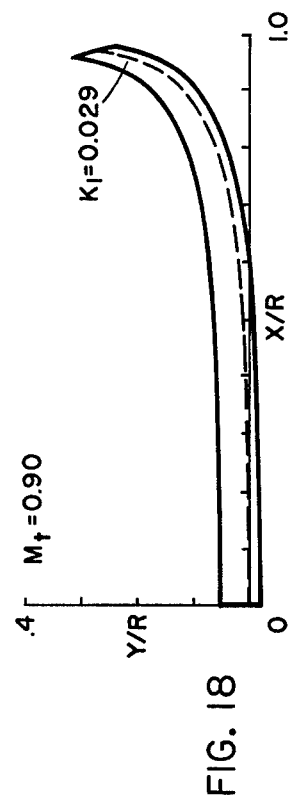
Figure 19:
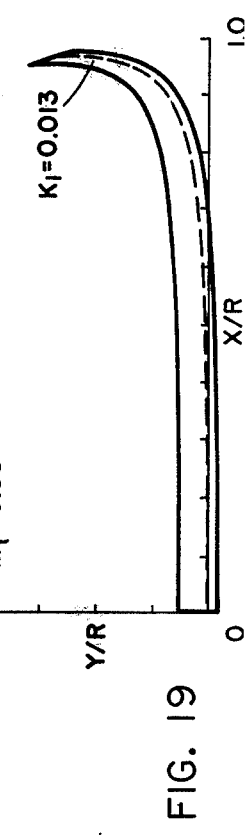
Figure 20:
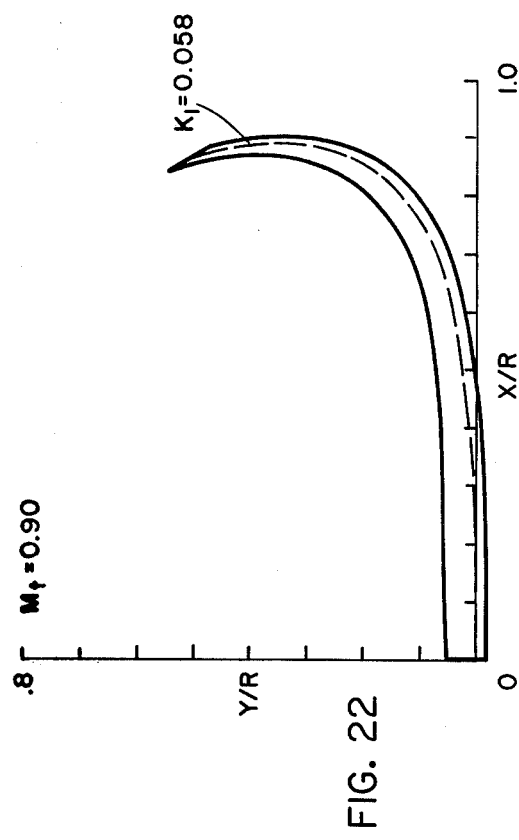
Figure 22:
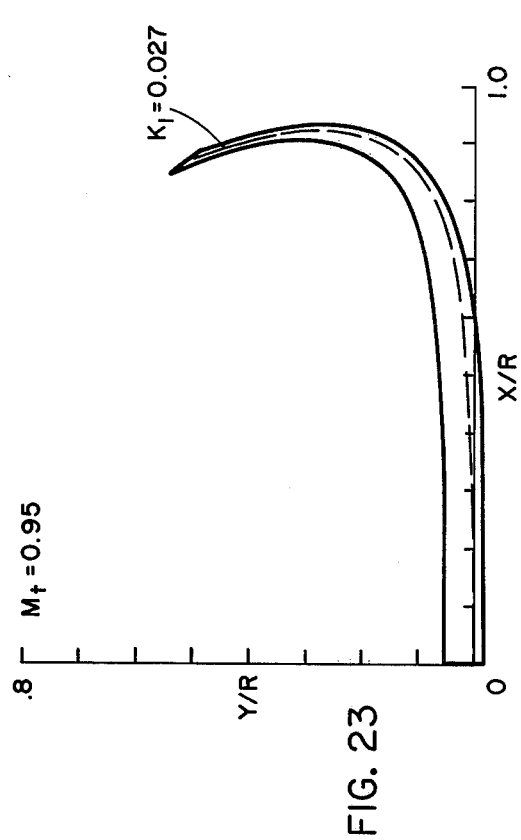
Figure 21:
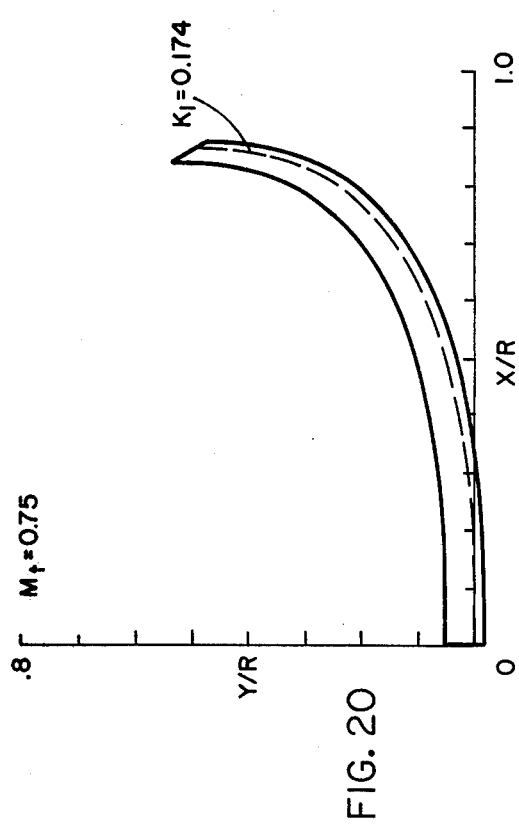
Figure 23:
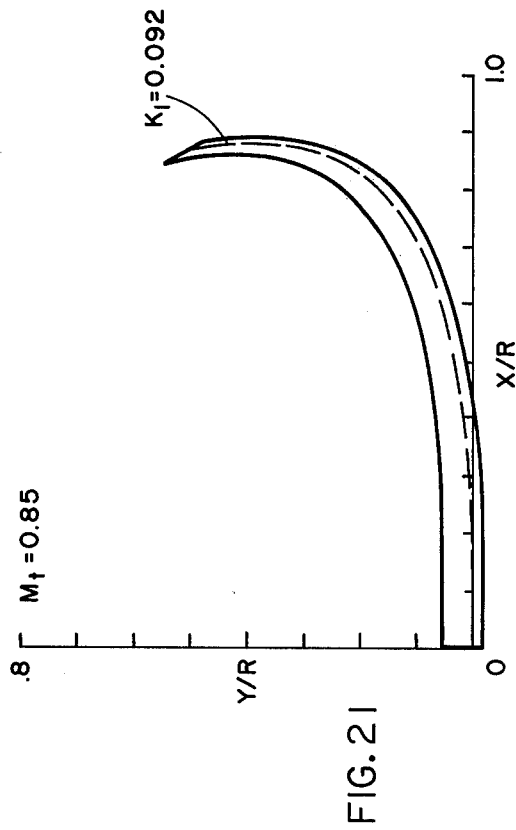
Figure 24:
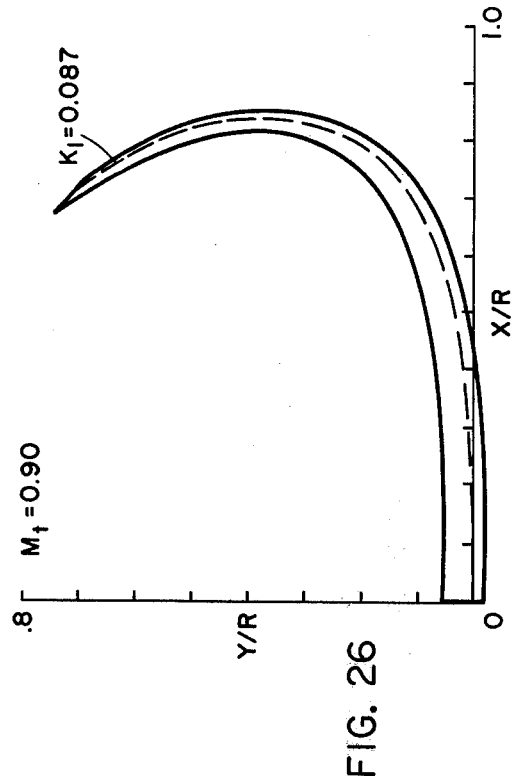
Figure 26:
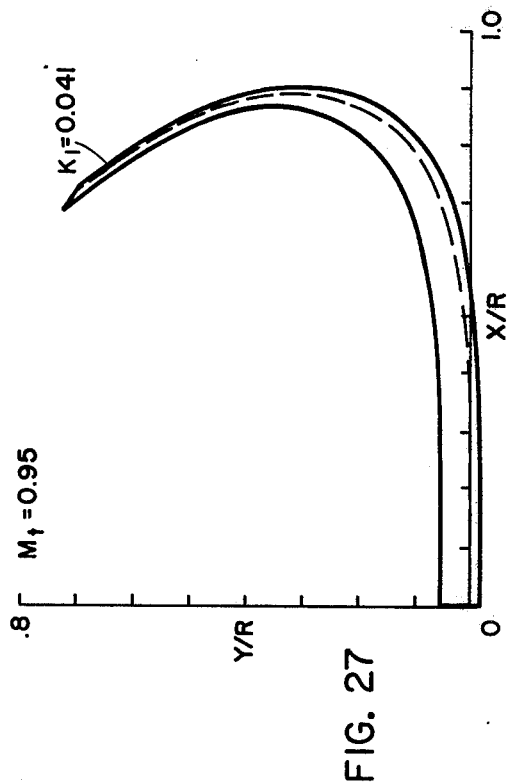
Figure 25:
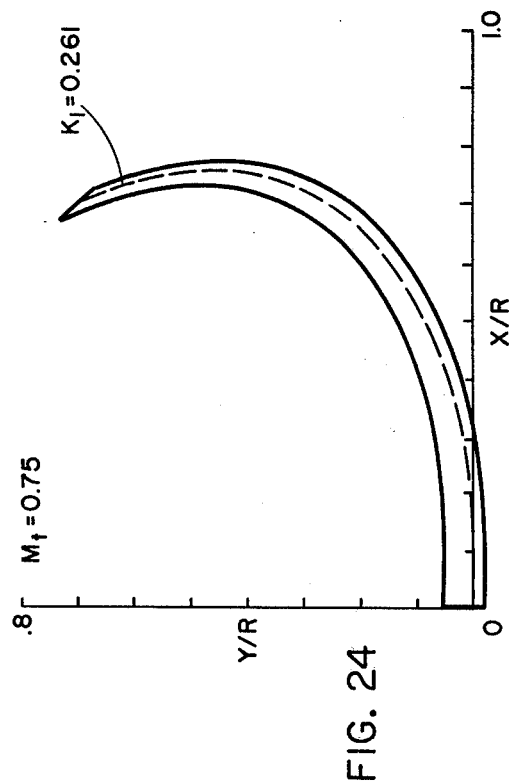
Figure 27:
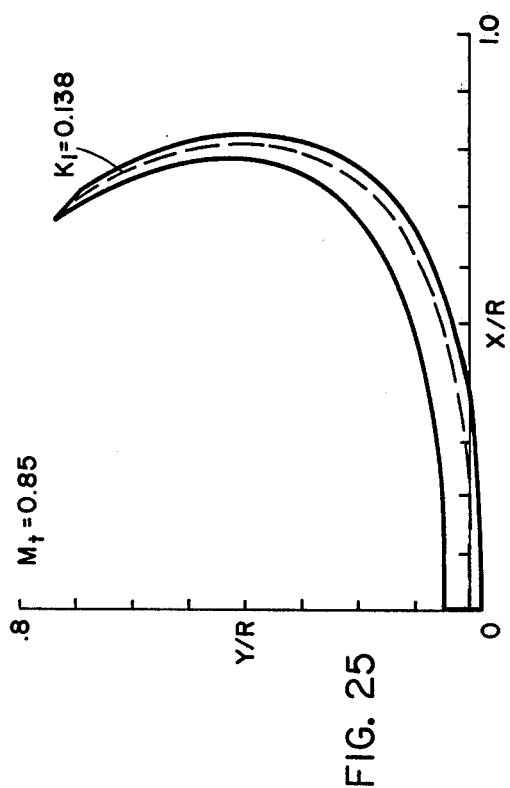

Referring now to FIG. 15, there is shown a rotor blade 121 in accordance with the present invention. The blade sweeps in a particular nonlinear manner from root 122 to tip 123. The radial distance from the root to tip is R (a fixed quantity for a given blade) and the radial distance from the root to the quarter chord line 124 is r (a variable). The angle between abscissa 126 and r, the sweep angle of a particular point on quarter chord line 126, is $\theta$. Specifically, the chord line 124 obeys the following mathematical relationship:

$$\theta = K_1 \left[ \frac{M_t(r/R)}{1 - M_t(r/R)} \right]$$

where
  $\theta \equiv$ sweep angle of the chord line,
  r = radial distance from blade root to chord line,
  R = blade radius,
  $M_t$ = advancing tip Mach number,
  $K_1$ = a constant.

The value of $K_1$ fixes the sweep angle from the root to the tip of the blade (the upper limit of $\theta$). Once a desired sweep angle (from root to tip) is selected and a design advancing tip Mach number is chosen, $K_1$ can be solved for by making r/R equal to one.

In FIGS. 16–27, blades in accordance with the subject invention are shown for typical values of $M_t$ and $K_1$. For simplicity, as in FIG. 15, the x and y blade dimensions have been normalized. It should be apparent that $X/R = (r/R) \cos\theta$, and $Y/R = (r/R) \sin\theta$.

The values of 0.75, 0.85, 0.90, and 0.95 have been employed for $M_t$. $K_1$ varies from 0.013 to 0.261 (for $\theta$ in radians). In FIGS. 16–19 the total quarter chord sweep is 15° and in FIGS. 20 to 23 the total quarter chord sweep is doubled (30°). The total quarter chord sweep for the blades in FIGS. 24–27 is 45°.

Figures 28, 29, 30:
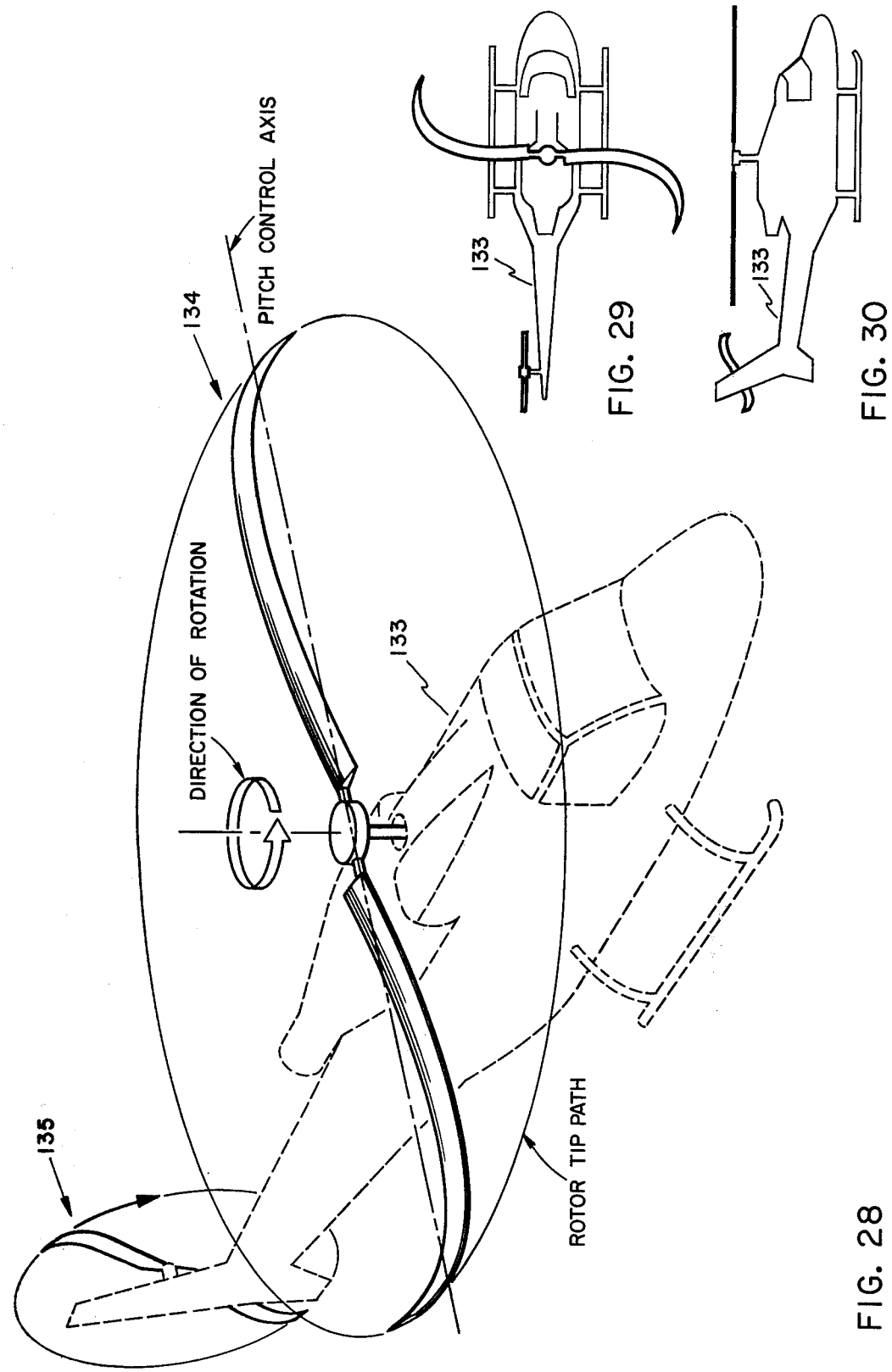
FIG. 28 is a perspective view of a helicopter utilizing main and tail rotors made in accordance with the present invention.
FIG. 29 is a plan view of the apparatus of FIG. 28.
FIG. 30 is an elevational view of the helicopter of FIG. 28.

FIG. 28 is a perspective view of a helicopter 133 utilizing blades made in accordance with the subject invention for both the main rotor 134 and the tail rotor 135. FIGS. 29 and 30 are plan and elevation views of helicopter 133.

Figure 31:
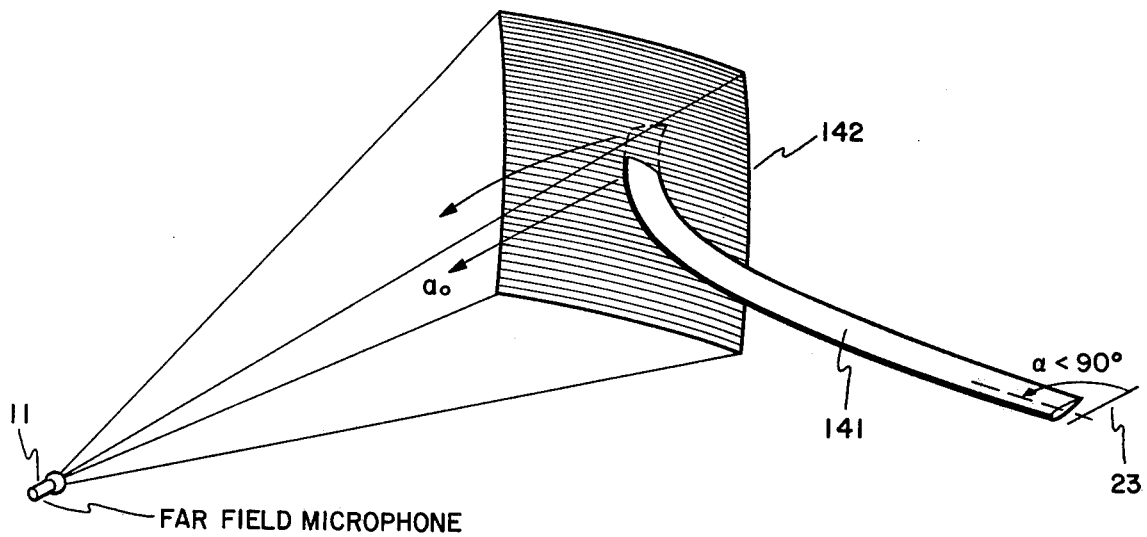
FIGS. 31–33 are perspective views of an acoustically swept blade intersecting a sound locus. Each view represents a different rotational position of the blade.
Figure 32:
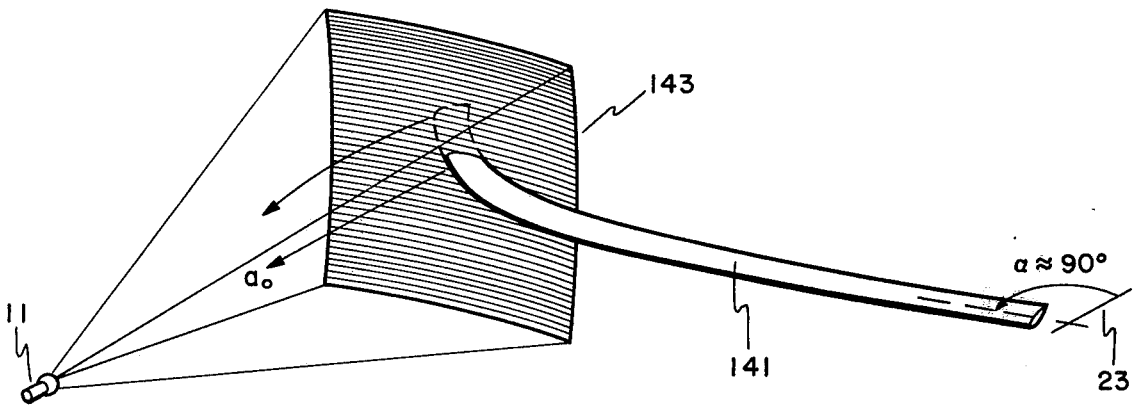
Figure 33:
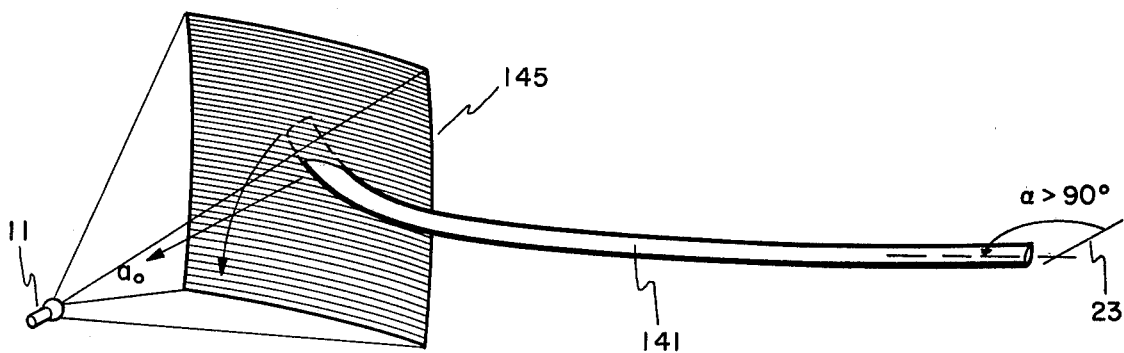

The above expression for $\theta$ dictates a blade with a continuous, nonlinear sweep extending from one extremity to the other. The blade is "acoustically" swept in such a manner that at no time does the mean chord line of the blade or the source line or the sink line coincide with a sound locus. That is, the acoustic radiation resulting from the summation of potential singularities used to model the flow about the blade tend to cancel for all times at an observation point in the acoustic far field. Accordingly, the potential discontinuity situation of FIG. 8 and the concomitant negative pulse of FIG. 9 is avoided. Stated still another way, when the blade is shaped in accordance with the above mathematical expression, for every blade interception with a sound locus, the source potential is matched by or in phase with a substantially opposite sink potential and disturbance cancellation results. Therefore, the acoustical phase cancellation mechanism effectively obviates impulsive noise. FIGS. 31–33 show a far-field acoustic test setup for an "acoustically swept" blade 141 made in accordance with the subject invention. In FIG. 31, counterclockwise rotating blade 141 makes an acute azimuth angle with respect to reference axis 23. Sound locus 142 does not coincide with either the source line or sink line (not shown) and the positive potential generated from the source is substantially equal in magnitude to the negative potential emitted from the sink. The aerodynamically generated acoustic disturbances cancel so that very little, if any, noise is detected at microphone 11. When blade 141 rotates to a position normal to reference axis 23 (FIG. 32), sound locus 143 also fails to coincide with the source line, sink line or mean chord line (not illustrated). Radiated noise is again obviated as there is acoustic cancellation of the emitted acoustic disturbances. In still a third example, where the azimuth angle $\alpha$ is greater than 90° (FIG. 33), sound locus 145 also fails to coincide with the source or sink lines and positive and negative potentials counteract one another. The noise reduction is a direct function of the root-to-tip blade sweep. Therefore, in regard to the acoustic sweep equation, noise reduction increases as $K_1$ increases. The blades of FIGS. 16 and 20 both have the same design advancing tip Mach number; however, the latter blade more efficiently reduces impulsive noise.

Although FIG. 28 shows the subject blade utilized on a helicopter, it is to be understood that the invention may be employed in other applications where high tip Mach numbers are encountered. For example, acoustically swept blades may be utilized on high tip speed propellers. Near and far field noise levels (in plane) would be reduced. This is especially important for aircraft where the cabin structure is located in close proximity to the tip path plane of the propeller. The subject invention can also be used to reduce noise in ducted fans and turbine fans with high tip speeds. FIG. 28 depicts a rotor with just two blades. It is to be understood that two is not a limit. If desired, a rotor may incorporate a great number of "acoustically swept" blades.

Although maximum noise reduction is achieved when the entire rotor blade is swept, benefits will be observed if just the outer portion of the blade is acoustically swept. For example, a "compromise" blade might have just the outer 30% of the blade acoustically swept.

What is claimed is:

1. A rotor blade with nonlinear sweep for reducing impulsive noise having a quarter chord line that conforms to $$\theta = K_1 \left[ \frac{M_t(r/R)}{1 - M_t(r/R)} \right]$$

where
$\theta$ = the sweep angle of the chord line,
r = the radial distance from the blade root to the chord line,
R = blade radius,
$M_t$ = advancing tip Mach number, and
$K_1$ = a constant.

2. A rotor blade with nonlinear sweep having a root, a tip and a quarter chord line, said quarter chord line for at least the outer blade portion extending from the 70% station to the tip conforming to $$\theta = K_1 \left[ \frac{M_t(r/R)}{1 - M_t(r/R)} \right]$$

where
$\theta$ = the sweep angle of the chord line,
r = the radial distance from the blade root to the chord line,
R = blade radius,
$M_t$ = advancing tip Mach number, and
$K_1$ = a constant.

3. A helicopter rotor for reducing impulsive noise comprising a plurality of nonlinearly swept blades, said blades each having a root, a tip, and a quarter chord line, a hub with an axis of rotation, said roots being connected to said hub, the quarter chord line of each blade conforming to $$\theta = K_1 \left[ \frac{M_t(r/R)}{1 - M_t(r/R)} \right]$$

where
$\theta$ = the sweep angle of the chord line,
r = the radial distance from the blade root to the chord line,
R = blade radius,
$M_t$ = advancing tip Mach number, and
$K_1$ = a constant, whereby when said blades and hub are rotated about said axis the aerodynamically generated acoustic radiation from blade sources tends to cancel in the acoustic far field the aerodynamically generated acoustic radiation from blade sinks.

4. The method of reducing impulsive noise in a helicopter rotor blade comprising the step of sweeping the quarter chord line of the blade continuously from root to tip nonlinearly in accordance with $$\theta = K_1 \left[ \frac{M_t(r/R)}{1 - M_t(r/R)} \right]$$

where
- $\theta$ = the sweep angle of the chord line,
- $r$ = the radial distance from the blade root to the chord line,
- $R$ = blade radius,
- $M_t$ = advancing tip Mach number, and
- $K_1$ = a constant.

* * * * *